United States Patent
Bathrick et al.

[11] Patent Number: 5,825,300
[45] Date of Patent: Oct. 20, 1998

[54] METHOD OF PROTECTED DISTRIBUTION OF KEYING AND CERTIFICATE MATERIAL

[75] Inventors: Erwin W. Bathrick, Brea, Calif.; John W. Garber, Davidsonville, Md.; Cheng-Chi Huang, Irvine, Calif.; Kenneth C. Kung, Cerritos, Calif.; Todd E. Matthews, Santa Ana, Calif.; James E. Zmuda, Lake Forest, Calif.; Regina L. Matthews, Yorba Linda, Calif.

[73] Assignee: Hughes Aircraft Company, Los Angeles, Calif.

[21] Appl. No.: 527,308

[22] Filed: Sep. 12, 1995

Related U.S. Application Data

[63] Continuation of Ser. No. 148,716, Nov. 8, 1993, abandoned.

[51] Int. Cl.$^6$ .................................................. G07D 7/00
[52] U.S. Cl. ........................ 340/825.33; 340/825.34; 380/23; 380/25; 380/30
[58] Field of Search ............... 340/825.31, 825.32, 340/825.33, 825.34; 380/23, 24, 25, 30

[56] References Cited

U.S. PATENT DOCUMENTS

| | | | |
|---|---|---|---|
| 4,590,470 | 5/1986 | Koenig | 340/825.31 |
| 4,799,061 | 1/1989 | Abraham et al. | 340/825.34 |
| 5,196,840 | 3/1993 | Leith et al. | 340/825.34 |
| 5,201,000 | 4/1993 | Matyas et al. | 380/30 |
| 5,224,163 | 6/1993 | Gasser et al. | 340/825.34 |
| 5,261,002 | 11/1993 | Perlman et al. | 380/30 |
| 5,268,962 | 12/1993 | Abadi et al. | 380/25 X |
| 5,319,710 | 6/1994 | Atalla et al. | 380/25 X |

*Primary Examiner*—Michael Horabik
*Assistant Examiner*—William H. Wilson, Jr.
*Attorney, Agent, or Firm*—Georgann S. Grunebach; Michael W. Sales; Wanda K. Denson-Low

[57] ABSTRACT

A computer system and a method for the protected distribution of certificate and keying material between a certification authority and at least one entity in the certification authority's domain, including the steps of sending keying material, including a password, generated by the Certifying Authority to the entity via a secure medium; generating and protecting, by the entity, a public and a private key pair using the keying material provided it by the certifying authority; generating, protecting and sending a request for a certificate to the certifying authority using the keying material provided it by the certifying authority; requesting, by the certifying authority, that the public key and address of the entity be sent to the certifying authority; protecting and sending the public key and address of the entity to the certifying authority using the keying material provided it by the certifying authority; assembling and issuing the certificate to the entity from the certifying authority and recording the public key of the entity at the certifying authority for public use within the domain of the certifying authority.

7 Claims, 1 Drawing Sheet

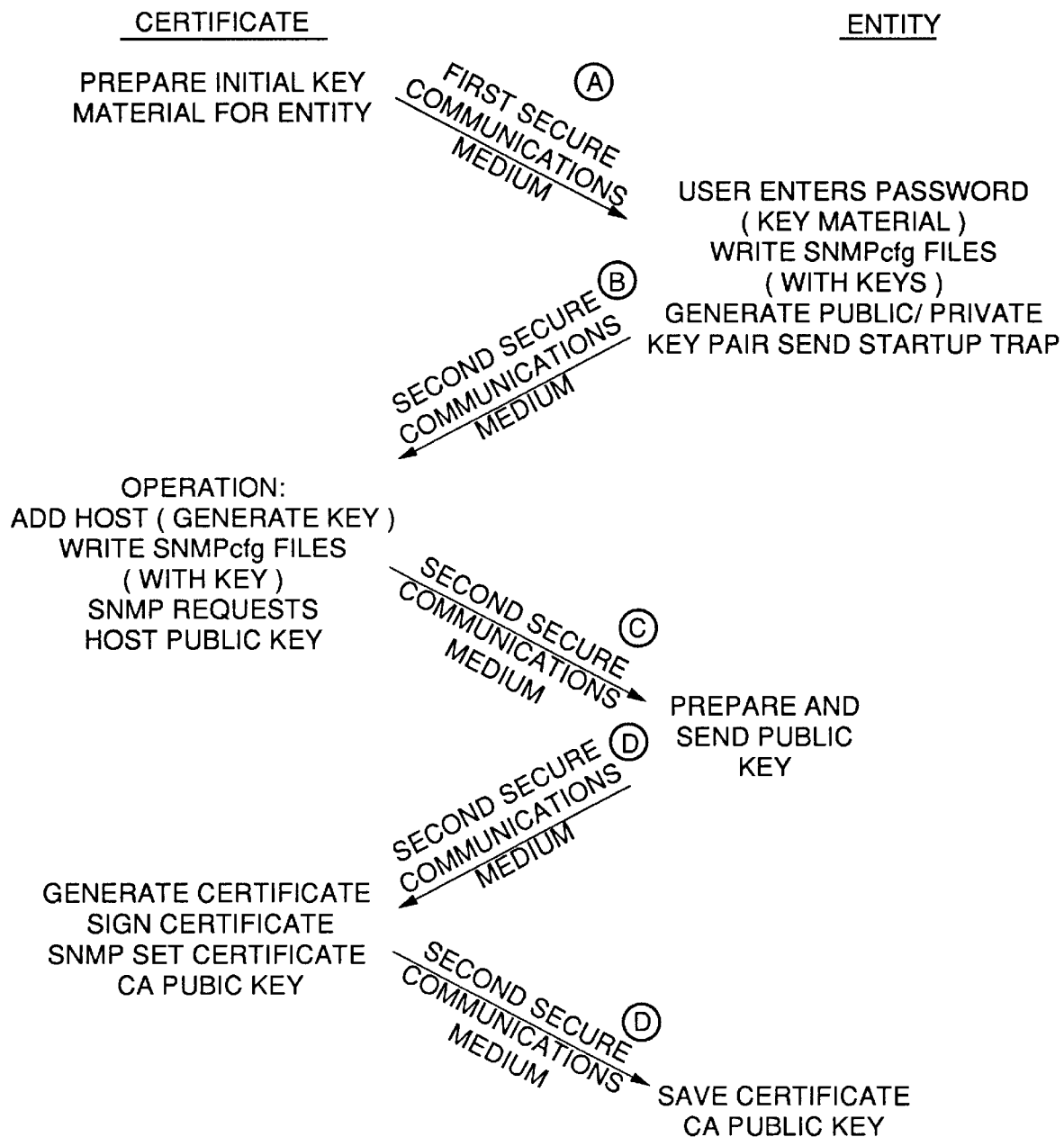

METHOD OF PROTECTED DISTRIBUTION OF KEYING AND CERTIFICATE MATERIAL

This is a continuation application Ser. No. 08/148,716, filed Nov. 8, 1993 abandoned.

BACKGROUND OF THE INVENTION

1. Field of the Invention

This invention relates in general to computer security systems, and, more particularly, to a computer security system and a method for the protected distribution of certificate and keying material between a certification authority and an entity in the certification authority's domain.

2. Description of the Related Art

In existing methods for distribution of certificate and keying material, the administrator must manually distribute the information to each end system (entity) and user. Administrators in the past were required to visit each system or user on the system more than once to initialize the information required to support the network security mechanism.

The certificate or keying material is used later to authenticate and to protect the communications between distributed entities. If these materials are compromised in the initial distribution, then the confidentiality and authentication services cannot be assured during further operation.

This manual distribution system is further fraught with difficulties in maintaining security in the physical transportation of the keying materials between the Certification Authority and the various entities, and with the consequent time lag mandated by the actual wait times involved in moving from one entity to the other. All during this setup time, the various entities are denied access to the protected data for which they may have an immediate need.

The present invention meets and overcomes this problem of maintaining security during the transfer of the keying materials between entities and shortens the time during which access is denied an otherwise authorized entity to a minimum.

The present invention reduces the required visits needed to install the necessary security access software to a single visit by using a password (shared secret) to generate the essential keying material to be used for both integrity and encryption services to protect the data necessary for authentication and network security protocol protection.

OBJECTS AND SUMMARY OF THE INVENTION

Therefore, it is an object of the present invention to provide a computer security network system and a method for the protected distribution of certificate and keying material between a certification authority and an entity in the certification authority's domain.

It is still another object of the present invention to provide a method and system that quickly provides authorized users control of their data.

It is another object of the present invention to provide a method and system that facilitates, rather than prevents, the establishment of encoded public and private key data or documents classified at different security levels.

The present invention provides a computer system and a method for the protected distribution of certificate and keying material between a certification authority and an entity in the certification authority's domain by establishing a shared secret and using it to protect the data transferred between the entity and the certifying authority.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE FIGURES

FIG. 1 is a block diagram flowchart showing the general overall logic flow through a system incorporating the present invention.

DESCRIPTION OF THE PREFERRED EMBODIMENT

A preferred form of the invention as embodied in a method and computing system for providing for the protected distribution of certificate and keying material between a certification authority and an entity in the certification authority's domain by establishing a shared secret and using it to protect the data transferred between the entity and the certifying authority.

In general, as shown in FIG. 1, the invention is found in a computer system operating over a network in accord with the following steps outlined below in detail to provide for the protected distribution of certificate and keying material between a certification authority and at least one entity in the certification authority's domain, The certifying authority begins by generating and sending keying material, including a password, to the subject entity via a first secure communications medium. In this instance, the most secure communications medium is a non-electronic medium, such as a manual courier, secure mail or other secure communications medium that is distinct from the computer system over which the keying material is to be used as described later in authenticating the entity to the certifying authority.

Once the entity receives the keying material from the certifying authority, it then generates a public and a private key pair and protects the public key using the keying material provided it by the certifying authority.

The entity now generates and protects a request for a certificate to the certifying authority by using the keying material provided it by the certifying authority. Once generated and protected, the request is sent to the certifying authority via a second secure communications medium connecting the certifying authority with the entities in its certifying domain.

Once the certifying authority receives the request from the entity, the certifying authority authenticates the identity of the requesting entity. This is done by requesting, via the second secure communications medium, that the public key and address of the entity be sent to the certifying authority.

The requesting entity, having received the authentication request from the certifying authority, protects the transmission of its selected public key and address to the certifying authority via the second secure communications medium, by using the keying material provided by the certifying authority.

Once the identity of the requesting entity is confirmed, the certifying authority then assembles and issues the requested certificate to the entity via the second secure communications medium, and records the public key of the entity at the certifying authority for public use by other entities within the certifying domain of the certifying authority.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A method for the protected distribution of certificate and keying material between a certifying authority and at least one entity in the certifying authority's domain via a communications medium connecting the certifying authority and entities in its domain, comprising the steps of:

sending keying material, including a password, generated by the certifying authority to the entity via a first secure communications medium, the keying material being provided to the entity to establish a shared secret to be used to protect data to be transferred between the entity and the certifying authority;

generating and protecting, by the entity, a public and a private key pair using the keying material provided the entity by the certifying authority;

generating and protecting a request for a certificate by use of the keying material, including the password, provided by the certifying authority, and sending via a second secure communications medium, the request for a certificate to the certifying authority;

requesting, by the certifying authority via the second secure communications medium, that the public key and address of the entity be sent to the certifying authority;

protecting and sending the public key and address of the entity to the certifying authority via the second secure communications medium using the keying material, including the password, provided the entity by the certifying authority;

confirming, by the certifying authority from said public key and address received from the entity, the identity of the entity;

if the identity of the entity has been confirmed by the certifying authority, assembling and issuing the certificate to the entity from the certifying authority via the second secure communications medium and recording the public key of the entity at the certifying authority for public use within the domain of the certifying authority.

2. The method of claim 1 wherein said step of sending keying material, including a password, generated by the certifying authority to the entity via a first secure communications medium further includes the step of:

using a first secure communications medium that is separate and independent from the second secure communications medium.

3. The method of claim 1 wherein said step of sending keying material, including a password, generated by the certifying authority to the entity via a first secure communications medium further includes the step of:

using a non-electronic transmission medium for the first secure communications medium, and wherein the second secure communications medium is an electronic communication medium.

4. The method of claim 3 wherein said non-electronic transmission medium is by physical delivery of said keying material by a manual courier.

5. The method of claim 3 wherein said non-electronic transmission medium is by physical delivery of said keying material by secure mail.

6. A method for the protected distribution of certificate and keying material between a certification authority and at least one entity in the certification authority's domain via a communications medium connecting the certification authority and entities in its domain, comprising the steps of:

sending keying material, including a password, generated by the certifying authority to the entity via a first secure communications medium, wherein said first communications medium is a non-electronic medium, thereby establishing the password as a shared secret to be used to protect data to be transferred between the entity and the certifying authority;

generating and protecting, by the entity, a public and a private key pair using the keying material provided the entity by the certifying authority;

generating and protecting a request for a certificate by use of the keying material, including the password, provided by the certifying authority, and sending via a second secure communications medium, said second medium comprising an electronic communications medium separate and independent from the first secure communications medium, the request for a certificate to the certifying authority;

requesting, by the certifying authority via the second secure communications medium, that the public key and address of the entity be sent to the certifying authority;

protecting and sending the public key and address of the entity to the certifying authority via the second secure communications medium using the keying material, including the password, provided the entity by the certifying authority;

confirming, by the certifying authority from said public key and address received from the entity, the identity of the entity;

if the identity of the entity has been confirmed by the certifying authority, assembling and issuing the certificate to the entity from the certifying authority via the second secure communications medium and recording the public key of the entity at the certifying authority for public use within the domain of the certifying authority.

7. The method of claim 6, wherein the keying material generated by the certifying authority and sent via the first secure communications medium is fixed in a tangible media which is transported via said first secure communications medium to said entity.

* * * * *